Patented Aug. 12, 1924.

1,504,437

UNITED STATES PATENT OFFICE.

GUILLAUME DE MONTMOLLIN AND GÉRALD BONHÔTE, OF BASEL, SWITZERLAND, ASSIGNORS TO THE SOCIETY OF CHEMICAL INDUSTRY IN BASLE, OF BASEL, SWITZERLAND.

DYESTUFFS, PROCESS OF MAKING SAME, AND THEIR APPLICATION.

No Drawing.   Application filed July 24, 1923. Serial No. 653,548.

*To all whom it may concern:*

Be it known that we, GUILLAUME DE MONTMOLLIN and GÉRALD BONHÔTE, both citizens of the Swiss Republic, and residing at Basel, Switzerland, have invented useful New Dyestuffs, Processes of Making Same, and their Application, of which the following is a full, clear, and exact specification.

It has been found that new and valuable dyestuffs may be obtained by combining the arylides of the 2-oxynaphthalene-3-carboxylic acid with the diazo-compounds of the general formula:

$$A-N=N-OH$$

wherein A represents an unsulfonated aromatic compound that carries, a group —OR (wherein R represents an aryl or aralkyl group) in ortho-position with regard to the diazo-group and which may bear other substituents.

These new azo-dyestuffs correspond with the general formula:

$$R_1-N=N-R_2$$

in which $R_1$ represents an unsulfonated aromatic complex that carries, besides other substituents, the group OR (wherein R represents an aryl or aralkyl residue) in ortho-position with regard to the diazo-group, and wherein $R_2$ represents the radical of an arylide of the 2-oxynaphthalene-3-carboxylic acid.

The particular interest of these dyestuffs resides in the fact that they may be produced directly on the fibre according to the usual methods of dyeing and printing the vegetable fibre with ice colors. They yield remarkably bright shades having a fastness to light surpassing that of all similar products hitherto known.

*Example.*

Cotton which has been treated with an alkaline solution of 20 grams of the anilide of the 2-oxynaphthalene-3-carboxylic acid per liter is passed through a bath formed by the diazo-compound of the phenylether of 2-amino-4-chlorophenol of the formula

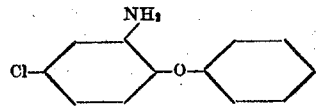

which has been neutralized by means of sodium acetate. The fibre is thus immediately dyed bright red tints with remarkable fastness to light, to chlorine and washing. Similar results are obtained with the toluidides of the 2-oxynaphthalene-3-carboxylic acid. Instead of the phenylether of the 2-amino-4-chlorophenol other aryl or aralkylethers may be used. The employment of the benzylethers yields blue shades, whereas the halogen arylethers of the o-aminophenol lead to more yellow tints.

The dyestuffs prepared as pigments for the production of lakes are red powders insoluble in water.

What we claim is:

1. The herein described process of producing new azo-dyestuffs by combining the arylides of the 2-oxynaphthalene-3-carboxylic acid with the diazo-compounds of the general formula:

$$A-N=N-OH.$$

wherein A represents an unsulfonated aromatic nucleus that carries a group —OR, (wherein R represents an aryl or an aralkyl group) in ortho-position with regard to the diazo-group and which may bear other substituents.

2. The herein described process of producing new azo-dyestuffs by combining the arylides of the 2-oxynaphthalene-3-carboxylic acid with the diazo-compounds of the general formula:

$$A-N=N-OH$$

wherein A represents an unsulfonated aromatic nucleus that carries a group —OR (wherein R represents an aryl group) in ortho-position with regard to the diazo-group and which may bear other substituents.

3. The herein described process of producing new azo-dyestuffs on vegetable fibre which consists in treating the vegetable fibre with the arylides of the oxynaphthalene-3-carboxylic acid and then treating it with the diazo-compounds of the general formula:

$$A-N=N-OH$$

wherein A represents an unsulfonated aromatic nucleus that carries a group —OR (wherein R represents an aryl or an aralkyl group) in ortho-position with regard to the diazo-group and which may bear other substituents.

4. The herein described process of producing new azo-dyestuffs on vegetable fibre which consists in treating the vegetable fibre with the arylides of the oxynaphthalene-3-carboxylic acid and then treating it with the diazo-compounds of the general formula:

$$A-N=N-OH$$

wherein A represents an unsulfonated aromatic nucleus that carries a group —OR (wherein R represents an aryl group) in ortho-position with regard to the diazo-group and which may bear other substituents.

5. The herein described new azo-dyestuffs corresponding with the general formula:

$$R_1-N=N-R_2$$

wherein $R_1$ represents an unsulfonated aromatic nucleus that carries a group —OR (wherein R represents an aryl or an aralkyl residue) in ortho-position with regard to the diazo-group and which may bear other substituents, and $R_2$ the radical of an arylide of the 2-oxynaphthalene-3-carboxylic acid, which compounds are in a dry state red powders insoluble in water.

6. The herein described new azo-dyestuffs corresponding with the general formula:

$$R_1-N=N-R_2$$

wherein $R_1$ represents an unsulfonated aromatic nucleus that carries a group —OR (wherein R represents an aryl residue) in ortho-position with regard to the diazo-group and which may bear other substituents, and $R_2$ the radical of an arylide of the 2-oxynaphthalene-3-carboxylic acid, which compounds are in a dry state red powders insoluble in water.

7. The material dyed with the new azo-dyestuffs of claim 5.

8. The material dyed with the new azo-dyestuffs of claim 6.

In witness whereof we have hereunto signed our names this 10th day of July 1923, in the presence of two subscribing witnesses.

GUILLAUME DE MONTMOLLIN.
GÉRALD BONHÔTE.
Witness:
　AMAND BRAUY,
　LUCIEN PICARD.